(12) United States Patent
Kakizawa et al.

(10) Patent No.: US 6,215,208 B1
(45) Date of Patent: Apr. 10, 2001

(54) MINIATURE MOTOR UNIT

(75) Inventors: Goro Kakizawa, Inagi; Koji Onishi, Saku, both of (JP)

(73) Assignee: Oken Seiko Co., Ltd., Tokyo (JP)

( * ) Notice: Subject to any disclaimer, the term of this patent is extended or adjusted under 35 U.S.C. 154(b) by 0 days.

(21) Appl. No.: 09/501,323

(22) Filed: Feb. 10, 2000

(30) Foreign Application Priority Data

Feb. 12, 1999 (JP) .................................................. 11-033756
Feb. 12, 1999 (JP) .................................................. 11-033761

(51) Int. Cl.⁷ .................................................. H02K 33/10
(52) U.S. Cl. ........................ 310/40 MM; 310/89; 310/91
(58) Field of Search ............................... 310/40 MM, 89, 310/91

(56) References Cited

U.S. PATENT DOCUMENTS 4,806,811 * 2/1989 Mayumi et al. ........................ 310/89

* cited by examiner

*Primary Examiner*—Nestor Ramirez
*Assistant Examiner*—Thanh Lam
(74) *Attorney, Agent, or Firm*—Pillsbury Winthrop LLP

(57) ABSTRACT

A miniature motor unit comprising a motor mounting member attached to an output side end of an outer casing of a motor, and configured to combine and fix the outer casing with and to the motor mounting member by forming mounting holes having fixing claws in the output shaft side end of the outer casing, forming bosses on the motor mounting member at locations corresponding to the mounting holes and pressing the bosses into the mounting holes.

2 Claims, 4 Drawing Sheets

MINIATURE MOTOR UNIT

BACKGROUND OF THE INVENTION a) Field of the Invention

The present invention relates to a miniature motor unit which has a configuration wherein a miniature motor is integrated with a motor mounting member.

b) Description of the Prior Art

Permanent-magnet field type miniature DC motors have conventionally been widely used for various types of compact appliance, portable appliances in particular, since these motors can be driven with batteries and have large torques for compact sizes of the motors. To mount these miniature motors on appliances to be driven with the motors, it is general to attach the motors to motor mounting members with screws.

FIGS. 1A and 1B show an outside casing of a conventional miniature motor; FIG. 1A being a front view of a bottom of the casing and FIG. 1B being a side sectional view of the casing. FIG. 2 is a partially sectional side view showing a condition where the motor using the outside casing is attached to a motor mounting member.

In FIGS. 1A and 1B, a reference numeral 1 represents the outside casing of the motor composed of an iron plate which is formed by drawing work or the like into a cup consisting of a cylindrical portion 1a and a bottom surface portion 1b. Outside a center of the bottom surface portion 1b, a bearing accommodator 2 is formed by drawing work to accommodate a bearing for an output shaft of a rotor. A reference numeral 3 designates a center hole to accommodate the bearing. Reference numeral 4a and 4b denote holes which are tapped inside and embossed inward at locations of the bottom surface portion which are apart 180° and symmetrical with regard to the center.

In FIG. 2, a reference symbol M represents a motor which uses the outside casing 1, a reference numeral 5 designates a cover casing which is fitted over the outside casing 1 and made of an insulating material, a reference numeral 6 denotes a terminal for connection to a power source and a reference numeral 7 represents a rotor shaft. A reference numeral 8 designates a motor mounting member of an appliance (compact pump or the like) which is to be driven with the motor; the motor mounting member consisting, like the outside casing, of a cylindrical portion and a bottom surface portion, and having holes formed in the bottom surface portion at locations corresponding to the tapped holes 4a and 4b formed in the outside casing 1. In addition, a center hole is formed in the bottom surface portion of the motor mounting member 8 to insert the bearing accommodator 2.

The motor M is attached to the motor mounting member 8 by bringing the motor M into contact with the motor mounting member 8 so that the bottom surface portion of the outside casing is brought into contact with the bottom surface portion of the motor mounting member 8, and tightening screws 9a and 9b into the tapped holes 4a and 4b of the outside casing 1.

However, the conventional miniature motors such as that described above require screw tightening in narrow spaces of the motor mounting member and have a large number of defects including a defect that the motors hardly allow assembling works to be automated.

SUMMARY OF THE INVENTION

A primary object of the present invention is to provide a miniature motor unit consisting of an outside casing of a motor which has a planar metal plate composing an output shaft side end of the motor and having a center hole or an output shaft side end made of a metal plate, and a motor mounting plate which has a planar plate portion having a center hole, wherein a plurality of mounting holes having fixing claws are formed in the output shaft side end of the outside casing of the motor, and at least two bosses are formed on the planar plate portion of the motor mounting plate at locations corresponding to the mounting holes formed in the outside casing so that the motor is fixed by tightening the bosses with the fixing claws in a condition where the output shaft side end of the motor is combined with the motor mounting member when the bosses of the motor mounting member are pressed into the mounting holes.

Another object of the present invention is to provide a miniature motor unit consisting of an outside casing of a motor which is made of a metal plate and has an output shaft side end having a center hole, and a motor mounting member which has a planar plate portion having a center hole, wherein a plurality of mounting holes are formed in the output shaft side end of the outside casing and at least two bosses are formed on a bottom surface portion of the motor mounting member at locations corresponding to locations of mounting holes formed in the outside casing so that the outside casing and the motor mounting member are fixed by thermally caulking or welding the bosses after combining the outside casing with the motor mounting member so that the bosses are inserted into the mounting holes formed in the motor mounting member.

DETAILED DESCRIPTION OF THE PREFERRED EMBODIMENTS

Now, the preferred embodiments of the present invention will be described with reference to the accompanying drawings.

Figure 1A:
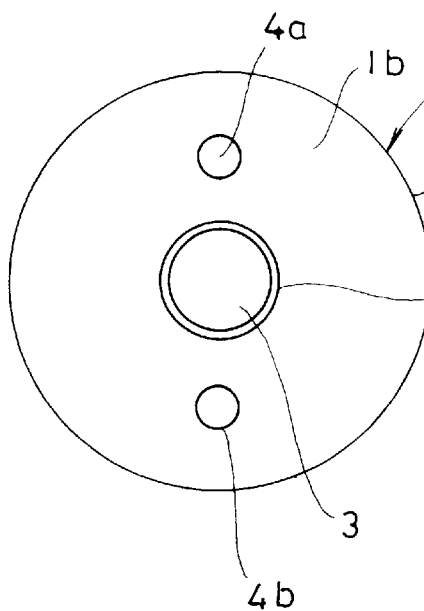
FIGS. 1A and 1B are diagrams showing a conventional miniature motor unit.
Figure 1B:
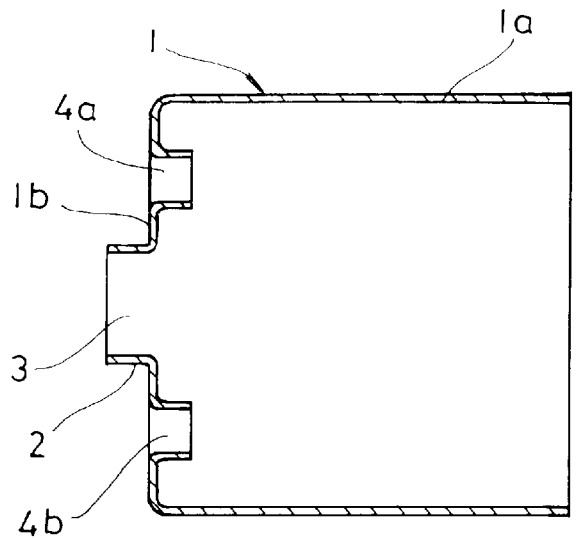
Figure 2:
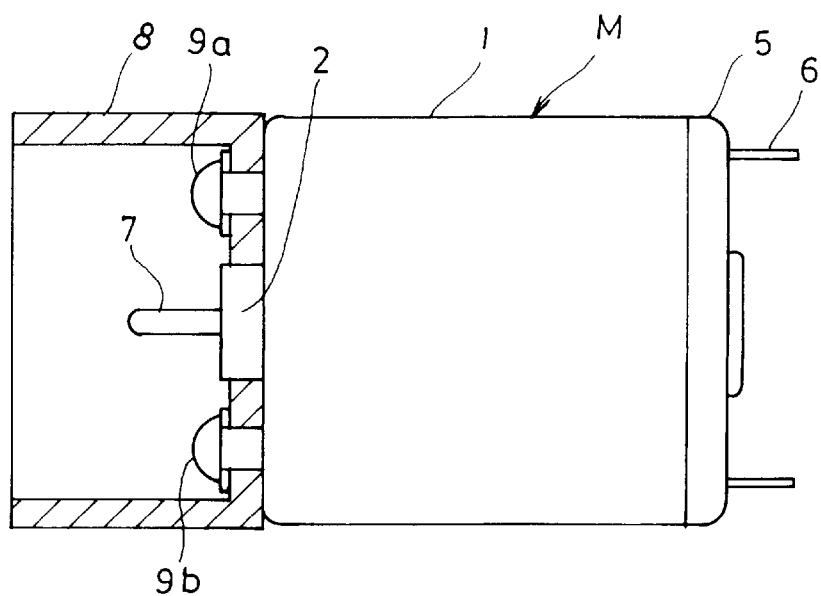
FIG. 2 is a diagram showing a combined condition of the conventional miniature motor unit mentioned above.
Figure 3A:
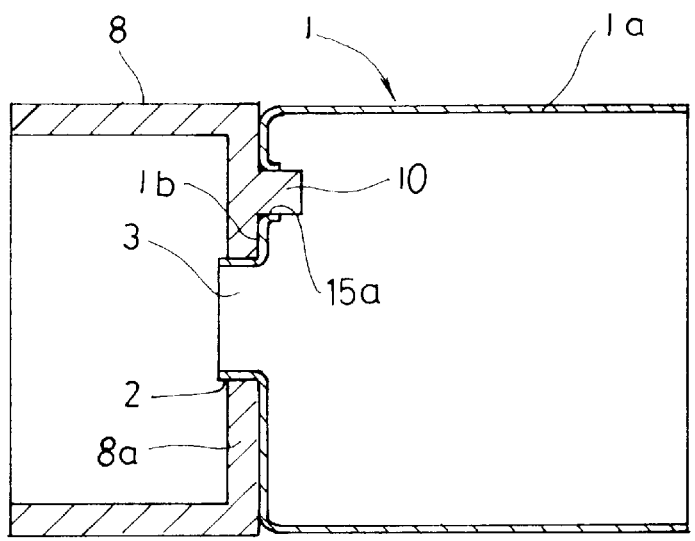
FIGS. 3A, 3B and 3C are diagrams showing a configuration of a miniature motor unit preferred as a first embodiment of the present invention.
Figure 3B:
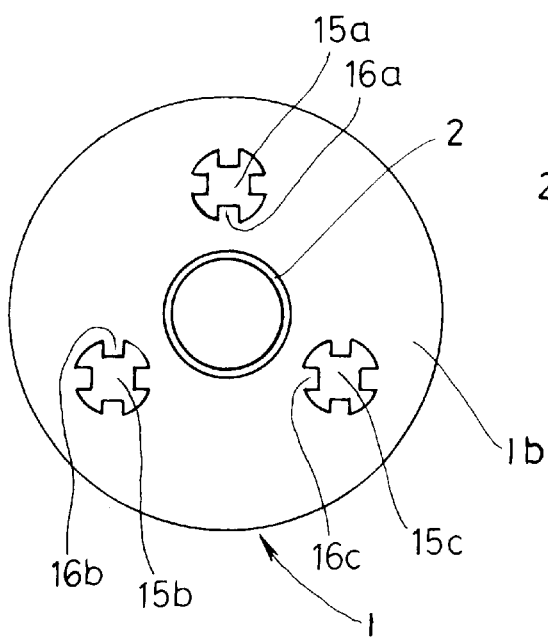
Figure 3C:
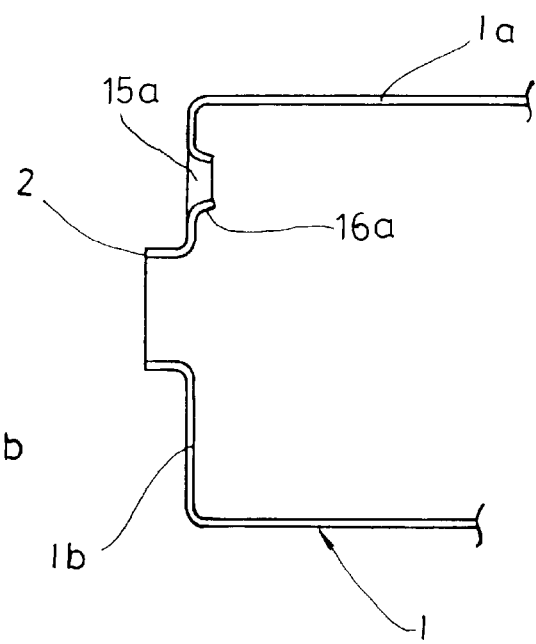
Figure 4A:
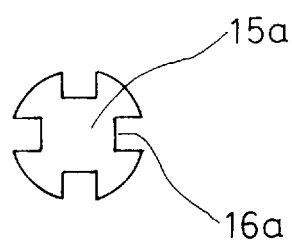
FIGS. 4A and 4B are diagrams showing a structure of a mounting hole in the first embodiment of the present invention.
Figure 4B:
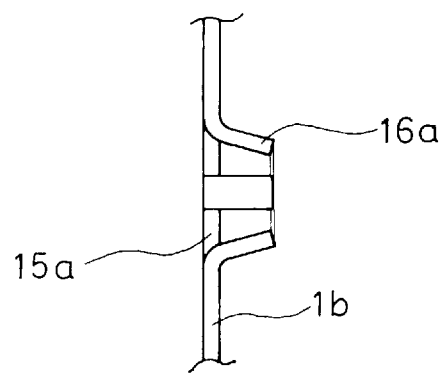

FIGS. 3A, 3B and 3C show a first embodiment of the motor unit according to the present invention which is an example wherein the present invention is applied to a motor which uses an outside casing as shown in FIGS. 1A and 1B. In these drawings, a reference numeral 1 represents an outside casing which is made of a metal plate, consists of a cylindrical portion 1a and a bottom portion 1b, and has a center hole 3 and a plurality of mounting holes 15a, 15b and 15c (three holes in the embodiment shown in FIGS. 3A, 3B and 3C) having fixing claws 16a, 16b and 16c such as that shown in FIGS. 4A and 4B formed in the bottom portion 1b which is an output shaft side end of the motor. Furthermore, a reference numeral 8 designates a motor mounting member which has a center hole formed in a bottom portion 8a thereof. These outside casing 1 of the motor and the motor mounting member 8 have structures which are substantially the same as those of the conventional example shown in FIGS. 1A, 1B and 2.

In the motor unit preferred as the first embodiment, bosses 10 are formed on the bottom portion 8a of the motor mounting member 8 at locations corresponding to the fixing claws 16a, 16b and 16c formed on the outer casing 1, and the outside casing 1 of the motor is combined with the motor mounting member 8 so that the bottom portions 1b and 8a are in contact with each other as shown in FIG. 3A.

The motor unit preferred as the first embodiment is configured to fix the outside casing 1 of the motor and the motor mounting member 8 with the bosses and the fixing claws 16a, 16b and 16c of the outside casing 1 of the motor by pressing the bosses 10 of the motor mounting member into the mounting holes 15a, 15b and 15c having the fixing claws 16a, 16b and 16c which are formed in the bottom portion 1b of the outside casing 1 of the motor.

Accordingly, the motor unit preferred as the first embodiment permit fixing the outside casing of the motor and the motor mounting member by a simple procedure only to press the bosses of the motor mounting member into the mounting holes 15a, 15b and 15c having the fixing claws 16a, 16b and 16c which are formed in the bottom portion 1b of the outside casing 1 of the motor, thereby extremely simplifying a work to manufacture the motor unit by combining and fixing the outside casing of the motor and the motor mounting member. Since the outside casing of the motor and the motor mounting member can be fixed after the motor is completed, a manufacturing work of the motor unit can be further simplified.

Figure 5A:
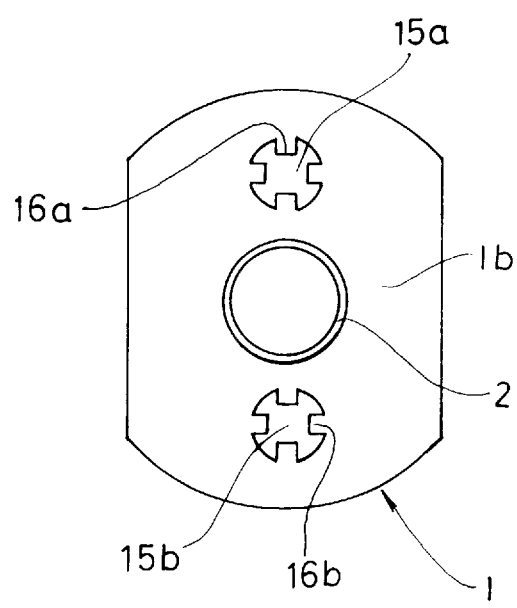
FIGS. 5A and 5B are diagrams showing a modification example of the first embodiment of the present invention.
Figure 5B:
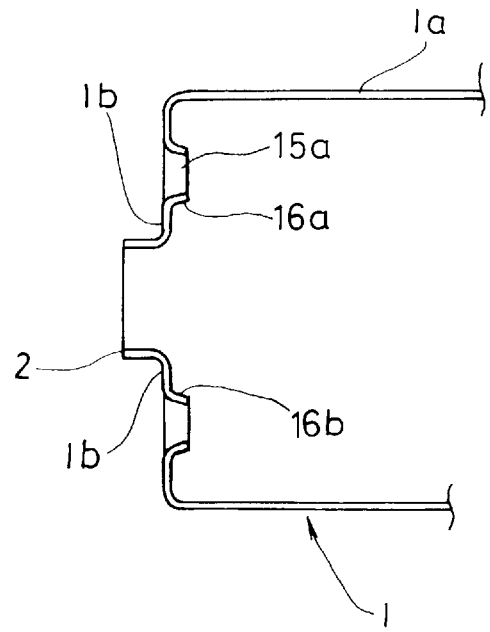

FIGS. 5A and 5B show a modification example of the embodiment illustrated in FIGS. 3A, 3B and 3C. Different from the motor unit shown in FIGS. 3A, 3B and 3C, this modification example uses an outside casing of a motor which has an elliptical bottom surface and a cylindrical portion having an elliptical sectional shape, but has a configuration which is substantially the same.

Though the first embodiment shown in the drawings is an example wherein the mounting holes having the fixing claws are formed in the bottom portion which is the output shaft side end of the outside casing, the mounting holes having the fixing claws may be formed in an output shaft side end of a motor made of a metal plate which is nearly planar as a whole and has yokes or the like. In other words, the motor unit according to the present invention can be manufactured by pressing bosses of the motor mounting member into mounting holes having fixing claws which are formed in a nearly planar output shaft side end.

Figure 6A:
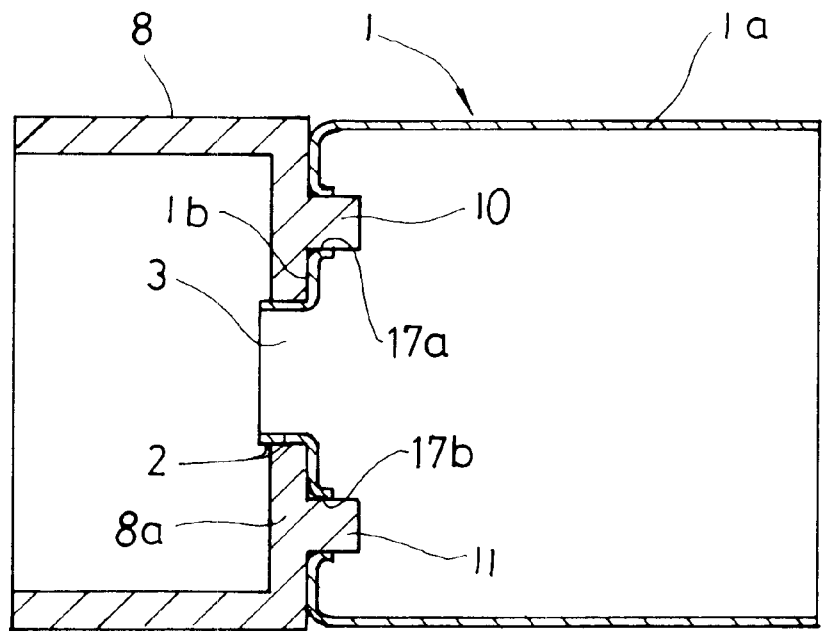
FIGS. 6A and 6B are diagrams showing a configuration of a miniature motor unit preferred as a second embodiment of the present invention.
Figure 6B:
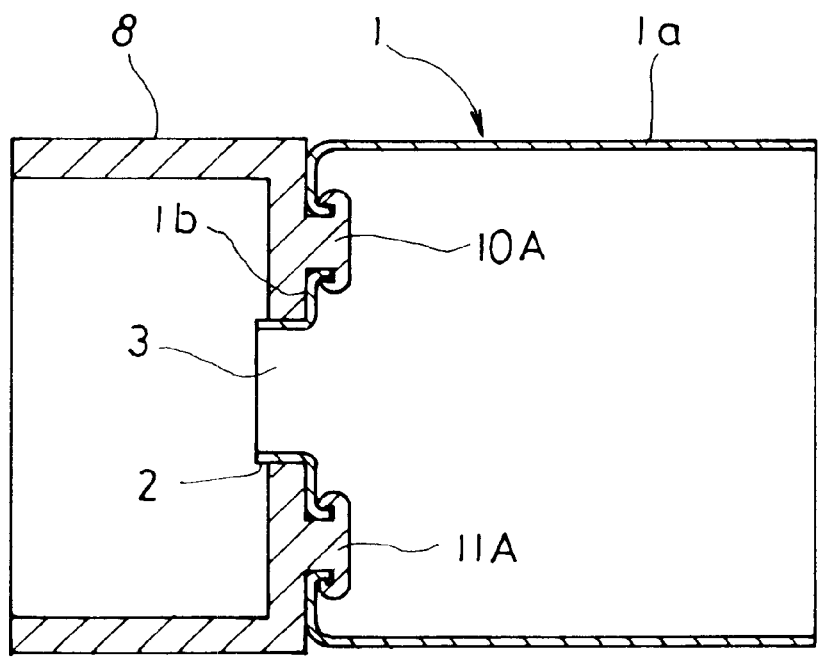

FIGS. 6A and 6B show a second embodiment of the motor unit according to the present invention. In FIGS. 6A and 6B, a reference numeral 1 represents an outside casing of a motor which is made of a metal plate, consists of the cylindrical portion 1a and a bottom surface portion (output shaft side end) 1b, and has a center hole 3 and a plurality of other holes which are formed in the bottom surface portion 1b. Furthermore, a reference numeral 8 designates a motor mounting member which has a center hole 2 formed in a bottom surface portion 8a. These outside casing 1 of the motor and the motor mounting member 8 are substantially the same as those in the conventional example shown in FIGS. 1A and 1B.

The motor unit preferred as the second embodiment of the present invention has bosses 10 and 11 which are formed on the bottom surface portion 8a of the motor mounting member 8 at locations corresponding to the holes 17a and 17b formed in the outside casing 1, and the outside casing 1 of the motor is combined with the motor mounting member 8 so that the bottom surface portions 1b and 8a are in contact with each other.

After the outside casing 1 of the motor and the motor mounting member 8 are combined as shown in FIGS. 6A and 6B, the outside motor casing 1 and the motor mounting member 8 are fixed and integrated by welding the bosses 10 and 11 as shown in FIG. 6B. After the outside casing of the motor and the motor mounting member have been combined and fixed as described above, the motor unit is completed by adding a motor.

Since the second embodiment uses thermal caulking or welding instead of screws to combine and fix the outside casing of the motor and the motor mounting member, the embodiment facilitates to fix the outside casing of the motor and the motor mounting member. Furthermore, the second embodiment can be configured more compact than the conventional example which uses screws.

The motor unit preferred as the second embodiment of the present invention is configured to form simple holes instead of tapped holes (holes having inside threads) in the outside casing of the motor and fix the outside casing of the motor and the motor mounting member by thermal caulking or welding utilizing the holes and the bosses formed on the motor mounting member.

Furthermore, a general motor has tapped holes formed in an outside casing at adequate locations as described above. Therefore, the present invention can utilize these taped holes in combination with the bosses to fix the outside casing and the motor mounting member by welding means such as thermal caulking or supersonic welding as in the embodiment described above, and mount a motor in the outside casing which is fixed to the motor mounting member.

The miniature motor unit according to the present invention requires only forming the bosses in the motor mounting member as described with reference to the embodiments since it requires no taps in the holes formed in the outside casing of the motor or no fixing screws. Furthermore, the miniature motor unit can be manufactured in extremely simple procedures since the outside casing of the motor and the motor mounting member are fixed by thermal caulking or welding.

Furthermore, the present invention makes it possible to utilize the tapped holes which are preliminarily formed in the outside casing of the general motor.

Though the motor mounting member has the cylindrical form (circular sectional shape) in each of the embodiments described above, this form is not limitative and the motor mounting member may have another form which has a hole corresponding to the center hole and bosses on a bottom surface. Furthermore, the motor mounting member may have a plate like form which has a hole corresponding to the center hole.

The miniature motor unit according to the present invention simplifies a work to fix the motor mounting member to the outside casing, permits automation of assembly which is conventionally difficult for the conventional miniature motors, can therefore be produced in a large quantity and is advantageous from a viewpoint of a manufacturing cost.

What is claimed is:

1. A miniature motor unit comprising: a motor; and a motor mounting member which is attached to an output shaft side end of an outer casing of said motor, wherein a plurality of mounting holes having fixing claws are formed in the output shaft side end of the outer casing of said motor, wherein said motor mounting member has at least a planar plate portion on which at least two bosses are formed at location corresponding to locations of said mounting holes formed in the output shaft side end of the outer casing of said motor, and wherein said motor mounting member is combined and fixed with and to the motor by pressing the bosses formed on a bottom of said motor mounting member into said mounting holes so that said bosses are tightened with said fixing claws and said motor mounting member is attached to the output shaft side end of the outer casing of said motor.

2. A miniature motor unit comprising: a motor; and a motor mounting member which is attached to an output shaft side end of an outer casing of said motor, wherein a plurality of mounting holes are formed in the output shaft side end of the outer casing of said motor, wherein said motor mounting member has at least a plate portion on which at least two bosses are formed at locations corresponding to locations of said mounting holes formed in the output shaft side end of the outer casing of said motor and wherein said motor is fixed by thermal caulking or welding utilizing said bosses after combining said outer casing with said motor mounting member by inserting the bosses formed on a bottom of said motor mounting member into said mounting holes formed on said outer casing.

* * * * *